(12) United States Patent
Braun et al.

(10) Patent No.: US 8,266,759 B2
(45) Date of Patent: Sep. 18, 2012

(54) WIPER BLADE OF A WINDSCREEN WIPER, PROVIDED WITH A PROTECTIVE RAIL

(75) Inventors: Hans Braun, Tienen (BE); Peter De Block, Halen (BE); Eric Windmolders, Kermt (BE); Edwin Luypaerts, Balen (BE); Hans Beelen, Herk de Stad (BE); David Van Baelen, Herent (BE); Wilhelm Fangmeier, Wolfsburg (DE)

(73) Assignee: Robert Bosch GmbH, Stuttgart (DE)

( * ) Notice: Subject to any disclaimer, the term of this patent is extended or adjusted under 35 U.S.C. 154(b) by 1029 days.

(21) Appl. No.: 11/815,500

(22) PCT Filed: Jan. 24, 2006

(86) PCT No.: PCT/EP2006/050391
§ 371 (c)(1),
(2), (4) Date: Aug. 27, 2008

(87) PCT Pub. No.: WO2006/082149
PCT Pub. Date: Aug. 10, 2006

(65) Prior Publication Data
US 2009/0025174 A1    Jan. 29, 2009

(30) Foreign Application Priority Data

Feb. 3, 2005   (DE) .......................... 10 2005 005 183
Aug. 8, 2005   (DE) .......................... 10 2005 037 269

(51) Int. Cl.
*B60S 1/38* (2006.01)
(52) U.S. Cl. .............. 15/250.201; 15/250.48; 15/250.41
(58) Field of Classification Search ............. 15/250.201, 15/250.43, 250.48, 250.4, 250.41, 250.361
See application file for complete search history.

(56) References Cited

U.S. PATENT DOCUMENTS

| 3,545,028 A | 12/1970 | Poland |
| 5,724,700 A * | 3/1998 | Marks ........................ 15/250.41 |
| 2003/0145412 A1 | 8/2003 | Weiler et al. |
| 2004/0098821 A1* | 5/2004 | Kraemer et al. ......... 15/250.201 |
| 2004/0187247 A1 | 9/2004 | Torii et al. |
| 2005/0011033 A1* | 1/2005 | Thomar et al. ........... 15/250.201 |

FOREIGN PATENT DOCUMENTS

| DE | 3005965 A1 | 9/1981 |
| DE | 3222864 A1 | 12/1983 |
| DE | 19626532 C1 | 10/1997 |
| DE | 10014753 A1 | 10/2001 |
| EP | 0635411 A1 | 1/1995 |
| EP | 1391360 A2 | 2/2004 |
| GB | 2106775 A | 4/1983 |

OTHER PUBLICATIONS

International Search Report of PCT/EP2006/050391.

* cited by examiner

*Primary Examiner* — Gary Graham
(74) *Attorney, Agent, or Firm* — Michael Best & Friedrich LLP

(57) ABSTRACT

The invention relates to a wiper blade (10) of a windshield wiper provided with a protective rail (32, 44, 56, 72, 88), comprising a base body (34) that has an essentially V-shaped cross section and a wiper lip (36) of the wiper blade (10) and that is detachably fixed to the wiper blade (10) with the aid of fixing elements (38, 52, 58, 78, 90). It is proposed that the wiper blade (10) consist of a wiper strip (14) with at least one flat, bar-type, elastic support element (26) and a spoiler (12), wherein the protective rail (32, 44, 56, 72, 88) rests on the support element (26) or spoiler (12).

3 Claims, 5 Drawing Sheets

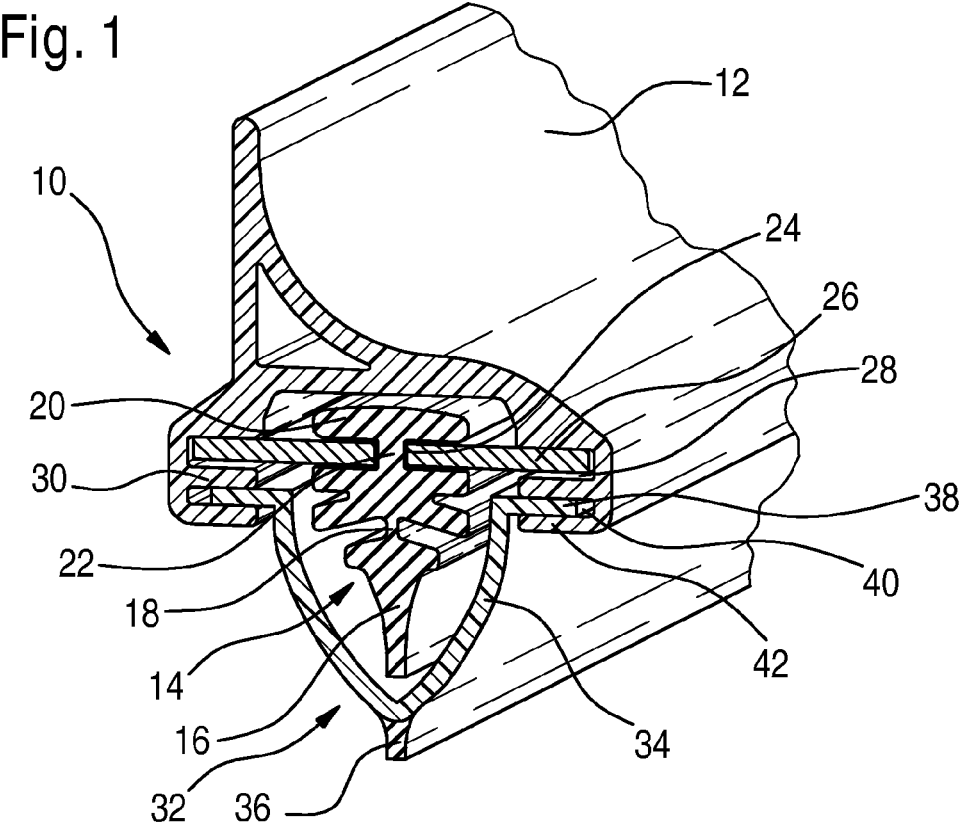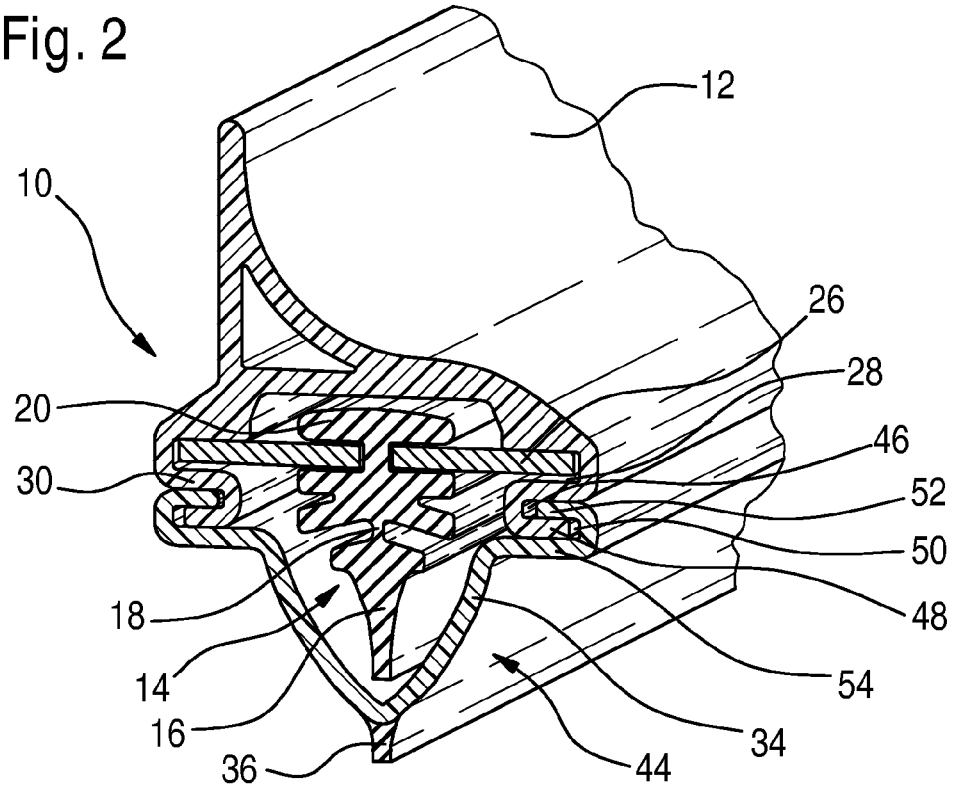

WIPER BLADE OF A WINDSCREEN WIPER, PROVIDED WITH A PROTECTIVE RAIL

BACKGROUND OF THE INVENTION

The invention relates to a wiper blade of a windshield with a protective rail.

Known windshield wipers have a wiper arm that is connected to the wiper blade in an articulated manner. The wiper blade includes a supporting bracket system or a flat, bar-shaped, elastic support element, which guides a wiper strip over a vehicle window, a windshield or a rear window. This wiper strip is comprised of an elastomer, e.g., a natural or synthetic rubber or of ethylene propylene. It has a top strip, which is connected via a tilting web with a wiper lip that is adjacent to the vehicle window. The tilting web is formed by two longitudinal grooves that are open to the outside.

Covering the wiper strip with a protective rail before a new motor vehicle is preserved in order to assure that the wiper strip is in a perfect state when the motor vehicle is delivered is known from DE 30 05 965 A1. The protective rail is not removed until the new motor vehicle is delivered to an end consumer after the final preservation. If, however, the windshield gets dirty during interim storage of the motor vehicle, during preservation, etc., or if sight is impaired by rain, it is not easy for the motor vehicle's wiper system to clean the windshield so that the motor vehicle can be moved around, because the protective profile is rigid and hard and is only partially adjacent to the windshield.

As a result, the protective rail has a flexible band on the side facing the windshield, which, e.g., is extruded onto the protective rail. Said protective rail is comprised preferably of hard PVC and the band of soft PVC.

The protective profile is fixed to the wiper blade, in that it engages with claws in the longitudinal grooves, which form the tilting web. The protective rail does not protect the parts of the wiper strip that project beyond the wiper lip. In addition, the hard protective rail can follow the curvatures of the vehicle window only to a slight degree.

EP 0 635 411 A1 discloses a wiper blade with a protective rail, whose base body has a V-shaped cross-sectional profile and clasps a wiper lip of a wiper strip, in that inwardly pointing webs engage in longitudinal grooves of the wiper strip. A top strip of the wiper strip is held by claws, which are part of a supporting bracket system and engage in additional longitudinal grooves of the wiper strip. Formed on the base body of the protective rail beyond the inwardly pointing webs are lateral fingers, which can extend over the entire length of the wiper blade and laterally cover the claws, wherein the fingers have inwardly bent shoulders, which can be used to clip the protective rail on the claws. A wiper lip is externally fixed on the edge of the protective rail, where the side walls of the base body converge in a V-shape. This gives the protective rail the possibility of drying and cleaning the vehicle window. However, because of its great bending resistance moment, the protective rail is very resistant to bending around the vertical axis so that it is only able to adapt to the curvature of the vehicle window in a negligible manner.

SUMMARY OF THE INVENTION

According to the invention, the wiper blade consists of a wiper strip with at least one flat, bar-type, elastic support element and a spoiler, wherein the protective rail rests on the support element or spoiler. As a result, the protective rail can be designed to be relatively flat and it is therefore more flexible. Moreover, said protective rail attaches to the spoiler or to the elastic support element so that the entire wiper strip is protected by the protective rail and the spoiler. Since the support element or the spoiler is pre-bent in such a way that it has a greater curvature than the vehicle window, the protective rail, which can be comprised of a similar material as the spoiler, is also pre-bent so that said protective rail can easily follow the curvature of the vehicle window under the pressure force of a wiper arm. The protective rails can have a wiper lip on the side facing the vehicle window in order to dry and clean the vehicle window.

According to an embodiment of the invention, it can also be expedient, however, for a supplemental wiper blade to be detachably fixed to the spoiler or to a spoiler protection. This supplemental wiper blade can be designed very simply and be shorter than the normal wiper blade. It expediently has a plastic carrier, which carries a wiper rubber and is detachably fixed to the spoiler or to the spoiler protection via a fixing element, e.g., in that the fixing element is clipped to the spoiler or to the spoiler protection on both sides of the wiper blade each with a clip on both sides of a connecting element of the wiper blade.

The clips are located in the vicinity of the connecting element, via which the wiper blade is connected to a wiper arm in an articulated manner, so that the ends of the supplemental wiper blade can easily follow the curvature of the vehicle window. While the protective rail, which in this case does not need to have a wiper lip, is mounted before preservation of the new vehicle, the supplemental wiper blade is expediently not mounted until after preservation. As a result, it is not subjected to the temperatures and chemical influences during preservation so that wear is reduced and the wiping properties are improved.

The protective rail can simply be detachably connected to the spoiler, if its base body towards the spoiler has a flange that is bent outwardly by approx. 90° on each of its longitudinal sides, which flange engages in a longitudinal groove that is open to the inside, which is formed by two ribs of the spoiler, wherein the flange rests on the sides of the ribs that face one another. Due to the pre-bent spoiler, the flange is adjacent to both ribs with an initial tension so that the protective rail does not have to be additionally secured in the longitudinal direction.

According to another embodiment of the invention, a longitudinal groove that is open to the inside is adjacent to the base body of the protective rail, in which groove an outwardly oriented rib of the spoiler engages. The longitudinal groove is expediently formed by a flange that is bent to the outside from the base body of the protective rail and an inwardly oriented groove wall that is formed on said flange. The outwardly oriented rib of the spoiler advantageously forms, with an inwardly oriented rib, a groove that is open to the outside, in which the groove wall of the protective rail engages so that a nested, positively-engaged connection is formed between the protective rail and the spoiler.

The protective rail can also be clipped on the lower portion from the outside. In this case, a holding profile is used that attaches to an outwardly bent flange on the base body of the protective rail. The holding profile clasps the lower portion of the spoiler in the region of the support element so that the protective rail is held on the spoiler by the flange and an upper leg of the holding profile. In order to easily clip the protective rail on the spoiler, one embodiment of the invention provides for a ridge to be formed on the leg of the holding profile of the protective rail, which ridge is bent away from the outer contour of the spoiler. The ridge facilitates both the assembly as well as disassembly of the protective rail. If the wiper blade has an end cap on its ends, it is therefore advantageous if the flange of the protective rail as well as the holding profiles with the ridges have recesses in the region of the end cap.

Instead of the holding profile formed on the protective rail, individual clips can also be provided that are used to fix the protective rail to the lower edge of the spoiler. In this case, a holding profile of the clip clasps the lower portion of the spoiler with a leg in the region of the support element, while a part that is bent away from the spoiler of the outwardly oriented flange of the base body of the protective rail engages in a longitudinal groove of the clip, which is open to the inside. As a result, the clip presses the protective rail with its outwardly oriented flange against the lower side of the spoiler. Several clips are provided over the length of the wiper blade in a distributed manner.

However, the protective rail can also be held in the longitudinal grooves of the wiper strip via inwardly pointing webs, wherein the side walls of the base body of the protective rail project beyond the longitudinal ribs towards the spoiler and rest on the support element or the support elements. Another variation provides for the spoiler to be protected by a spoiler protection, which is adapted to the outer contour of the spoiler. As a result, the spoiler is also protected in an advantageous manner during preservation so that its surface cannot be damaged. At the same time, the protective rail can be fixed to the spoiler protection, and namely as a rule in a same manner as to the spoiler itself. The advantage of this, however, is that after removing the protective rail and the spoiler protection, no holding elements are left on the spoiler that foster the collection of dirt and can interfere with the optical appearance.

BRIEF DESCRIPTION OF THE DRAWINGS

Additional advantages are yielded from the following description of the drawings. Exemplary embodiments of the invention are depicted in the drawings. The drawings, the description and the claims contain numerous features in combination. The person skilled in the art will also observe individual features expediently and combine them into additional, meaningful combinations.

The drawings show:

FIG. 1 A perspective cross section through a wiper blade in accordance with the invention FIGS. 2 and 3 Variations of FIG. 1

DETAILED DESCRIPTION

Figure 3:
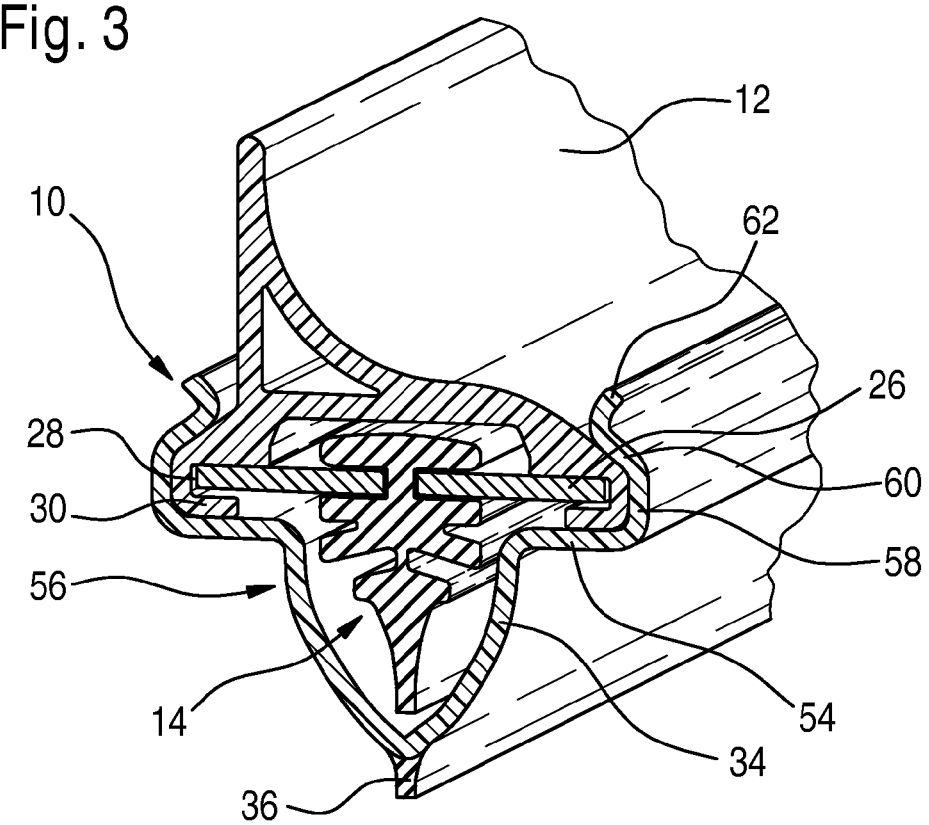

A wiper blade 10 has a wiper strip 14 with a wiper lip 16, which is connected via a tilting web 18 with a top strip 20. The top strip 20 features two opposing longitudinal grooves 24, which form a web 22. A flat, bar-shaped, elastic support element 26 is inserted into each of these grooves. The support element 26 is pre-bent in the longitudinal direction such that the wiper blade 10 is adjacent to a vehicle window with an appropriate pressure distribution under the pressure force of a wiper arm (not shown).

The wiper blade 10 also has a spoiler 12, which has two inwardly oriented longitudinal grooves 28 towards the support elements 26, in which the support elements 26 engage and thereby hold the spoiler 12 on the wiper blade 10.

In the direction of the wiper lip 16, the longitudinal groove 28 of the spoiler 12 is delimited by an inwardly pointing rib 30. In the embodiment according to FIG. 1, another longitudinal groove 40 is adjacent to the rib 30 on each longitudinal side, which groove is delimited by another rib 42 in the direction of the wiper lip 16.

A protective rail 32 clasps with its base body 34, which has a V-shaped cross section, the wiper lip 16 and the adjacent portion of the top strip 20, so that the wiper strip 14 is protected for one by the protective rail 32 and secondly by the spoiler 12 against the effects of the environment. The protective rail 32 is mounted before the preservation of a new vehicle and dismounted shortly before delivery of the vehicle to a customer. The protective rail 32 in the embodiment in FIG. 1 has on the edges of its base body 34 a flange 38 that is bent to the outside by approx. 90 degrees, which engages in the longitudinal grooves 40 of the spoiler 12. Said protective rail is therefore securely guided on the spoiler 12 and can assume the prescribed curvatures of the spoiler 12 with an appropriate selection of material. The protective rail 32 has a wiper lip 36 in order to execute the cleaning and drying function. As a result, the windshield wiper can be actuated before delivery of the vehicle without the wiper lip 16 or the vehicle window being damaged.

The embodiment in FIG. 2 differs from the embodiment in FIG. 1 in that the spoiler 12 has, on its longitudinal sides, instead of the longitudinal grooves 40 that are open to the inside, two longitudinal grooves 46 that are open to the outside, which are formed, on the one hand, by the inwardly pointing rib 30 and, on the other hand, by an outwardly pointing rib 48 attached thereto.

On the edges of its V-shaped diverging base body 34, a protective rail 44 has an outwardly bent flange 54, which forms, with groove walls 52, longitudinal grooves 50 that are open to the inside. The groove walls 52 engage in the longitudinal grooves 46 of the spoiler 12 that are open to the inside, while the outwardly oriented rib 48 of the spoiler 12 engages in the longitudinal groove 50 of the protective rail 44 that is open to the inside.

In the case of the embodiment in FIG. 3, a protective rail 56 also has outwardly diverging flanges 54 on the edges of the V-shaped diverging base body 34, however, attached to these flanges are holding profiles 58, whose legs 60 clasp the laterally projecting parts of the spoiler 12 in the region of the support elements 26. In order to better clip these on the spoiler 12 for easier assembly of the protective rail 56, the leg 60 has, on its free longitudinal edge, a ridge 62 that is bent away from the outer contour of the spoiler 12. The ridge 62 facilitates both assembly as well as disassembly of the protective rail 56, which in a mounted state is held on the spoiler 12 between the leg 60 and the flange 54.

Figure 4:
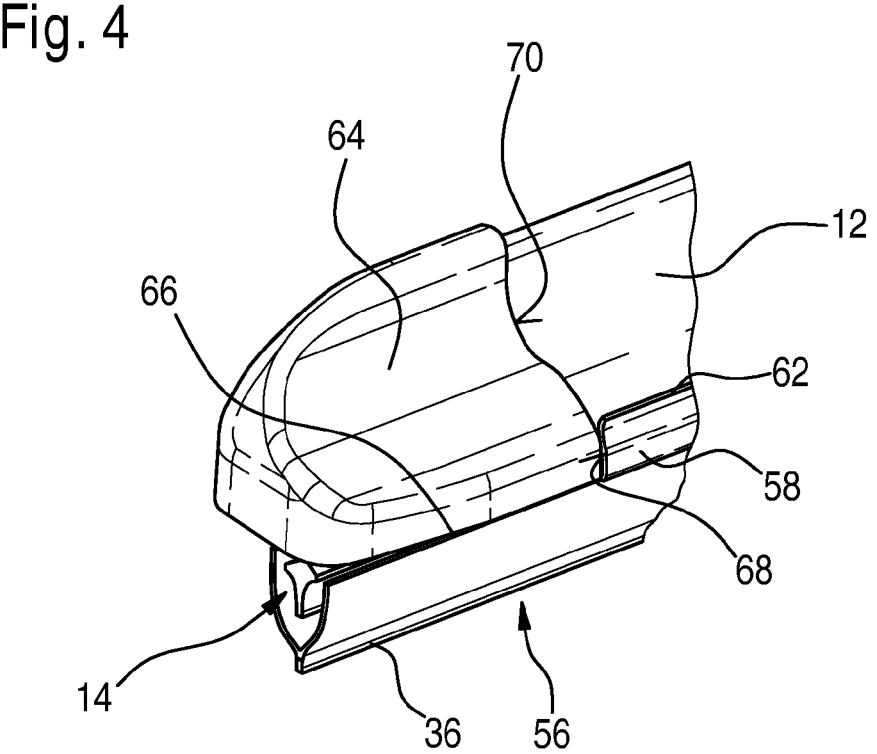
FIG. 4 A perspective representation of an end of a wiper blade with an end cap

The embodiment according to FIG. 4 corresponds essentially to the embodiment according to FIG. 3. However, the wiper blade 10 has an end cap 64, which is fixed on the support elements 26, overlaps the spoiler 12 on the end side and fixes the support elements 26. In the region of the end cap 64, the flange 54, the receptacle profile 58 with its leg 60 and the ridge 62 have a recess 66 for the end cap 64 so that the front walls 68 of the receptacle profile 58 are opposite from the facing fore part 70 of the end cap 64. The play between the fore parts 68 and 70 is selected so that it is great enough that no coercion occurs when the wiper blade 10 bends.

Figure 5:
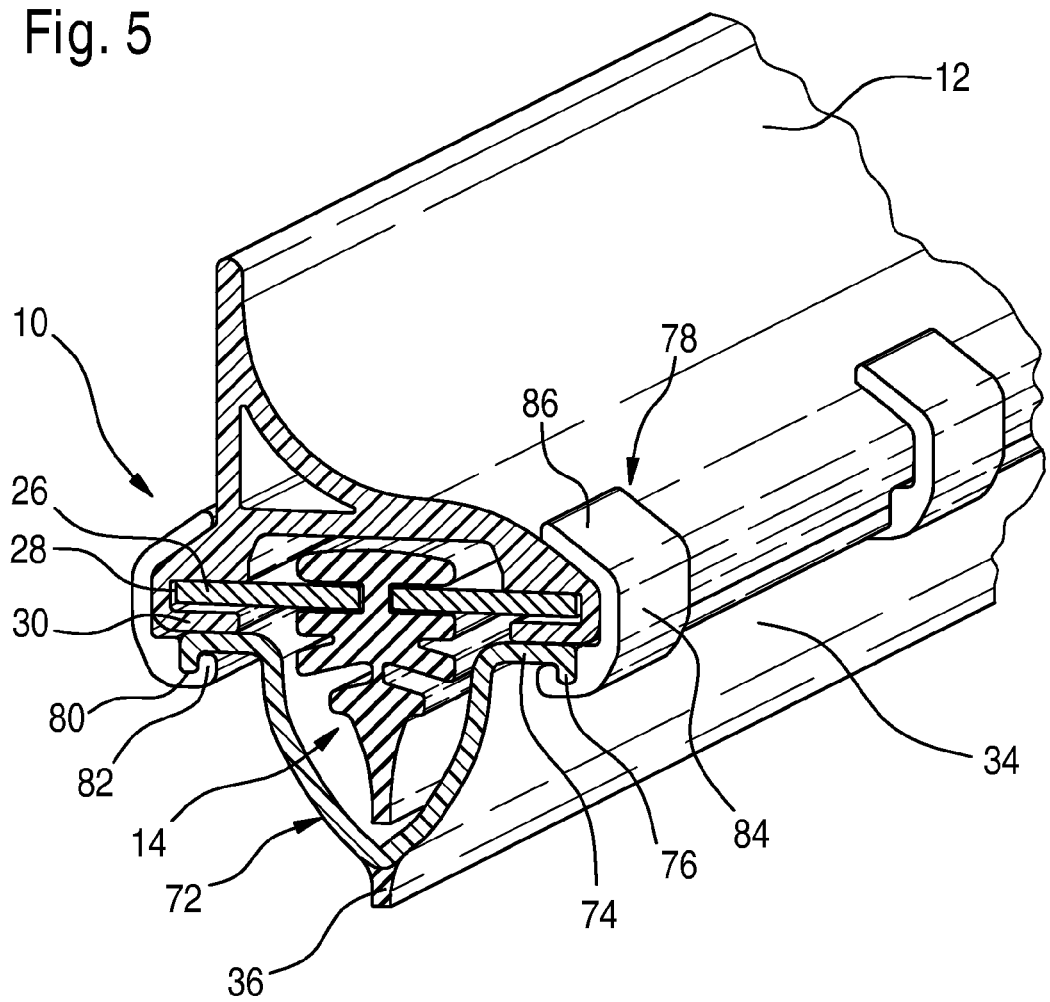
FIG. 5 A variation of FIG. 3

The embodiment according to FIG. 5 differs from the embodiments according to FIG. 3 and FIG. 4 in that, in the case of the protective rail 72, separate clips 78 are provided instead of a holding profile 58, and these clips fix the protective rail 72 on the laterally projecting edges of the spoiler 12. For this purpose, the protective rail 72 has, on the edges of the V-shaped diverging base body 34, outwardly bent flanges 74 with parts 76 bent towards the wiper lip 36. These parts engage in longitudinal grooves 80 of the clips 78. The longitudinal grooves 80 are delimited towards the inside by legs 82. The clips 78 clasp the laterally projecting edges of the spoiler 12 with a holding profile 84 and a leg 86 so that the flange 74 of the protective rail 72 is pressed against the inwardly oriented rib 30 of the spoiler 12 by the clips 78. Because of the clips 78, the protective rail 72 has a low bending resistance moment so that it is easily able to adapt to the curvatures of the vehicle window.

Figure 6:
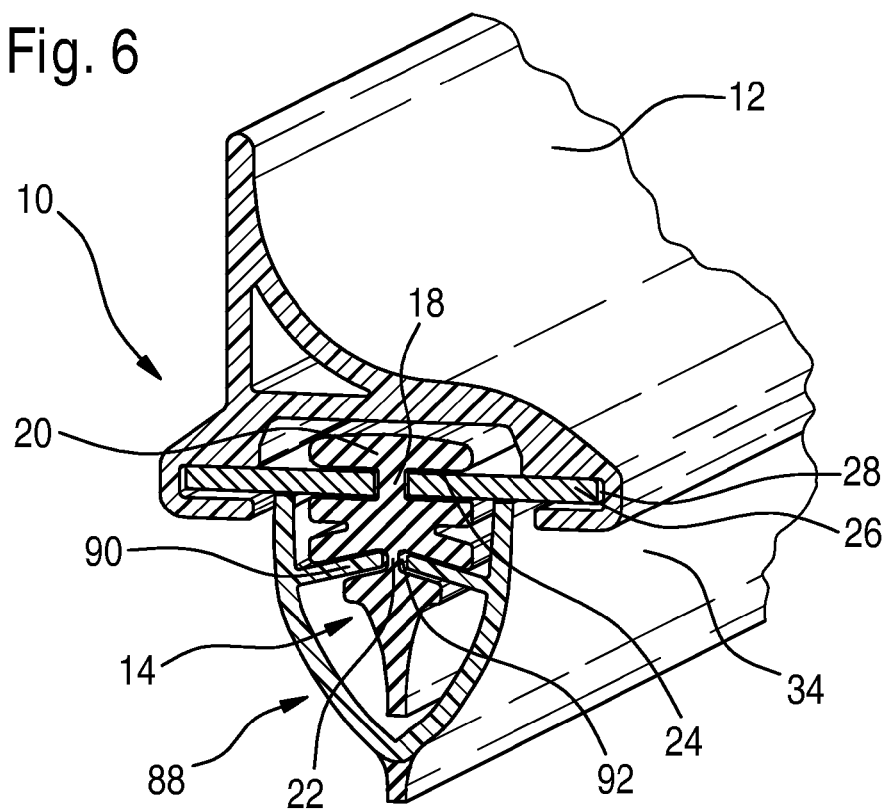
FIG. 6 A wiper blade with a protective rail, which is resting on a support element FIG. 7 A wiper blade with a protective rail and a spoiler protection FIG. 8 A perspective representation of a wiper blade with a supplemental wiper blade

A protective rail 88 according to an embodiment in FIG. 6 is particularly simple and economical. It has inwardly oriented ribs 90 on its base body 34, which engage in longitudinal grooves 92 on the sides of the tilting web 18. The parts of the protective rail 88 that project beyond the ribs 90 towards the spoiler 12 rest on the support elements 26 so that the wiper strip 14 is protected all around from the environment.

In many cases, it is desirable for not only the wiper strip but also the spoiler 12 to be protected during preservation of the vehicle so that said spoiler does not get damaged during preservation or become unsightly while the vehicle is being kept at the ready.

Figure 7:
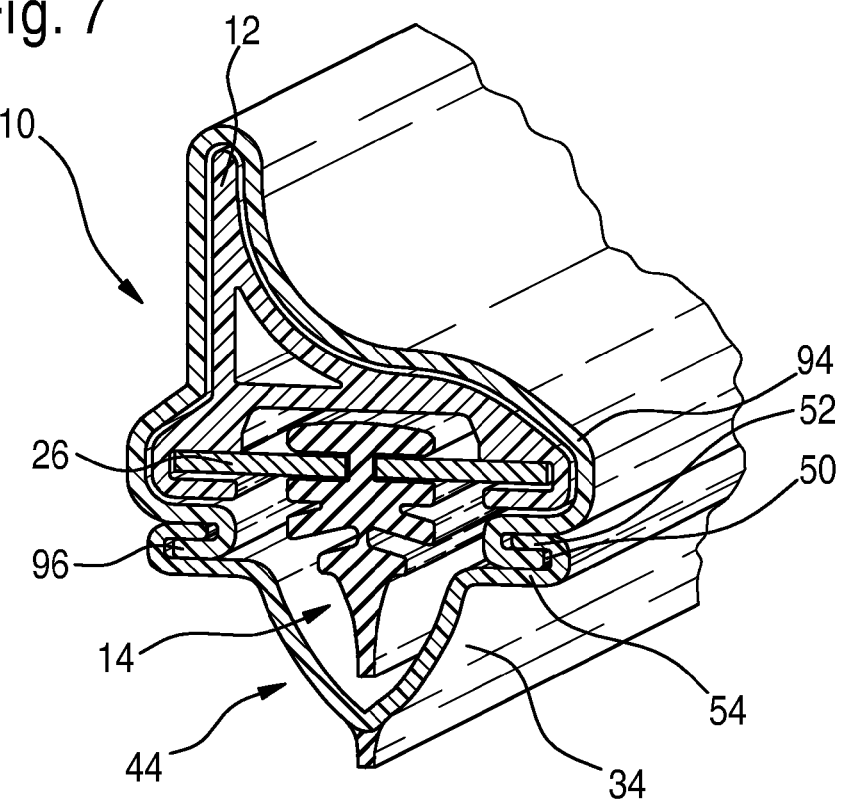

For this purpose, the embodiment in accordance with FIG. 7 has a spoiler protection 94, which is adapted to the outer contour of the spoiler 12 and can be slid over the spoiler 12 from the longitudinal side or clipped on crosswise to it. The spoiler protection 94 has outwardly pointing holding rails 96 similar to the groove walls 52 of the spoiler 12 in FIG. 2, which engage in the inwardly open longitudinal grooves 50 of the protective rail 44. As for the rest, the protective rail 44 and the spoiler protection 94 can be designed in accordance with the embodiments of the protective rails 32, 56 and the spoiler 12 according to the embodiments in FIG. 1 and FIG. 3.

Figure 8:
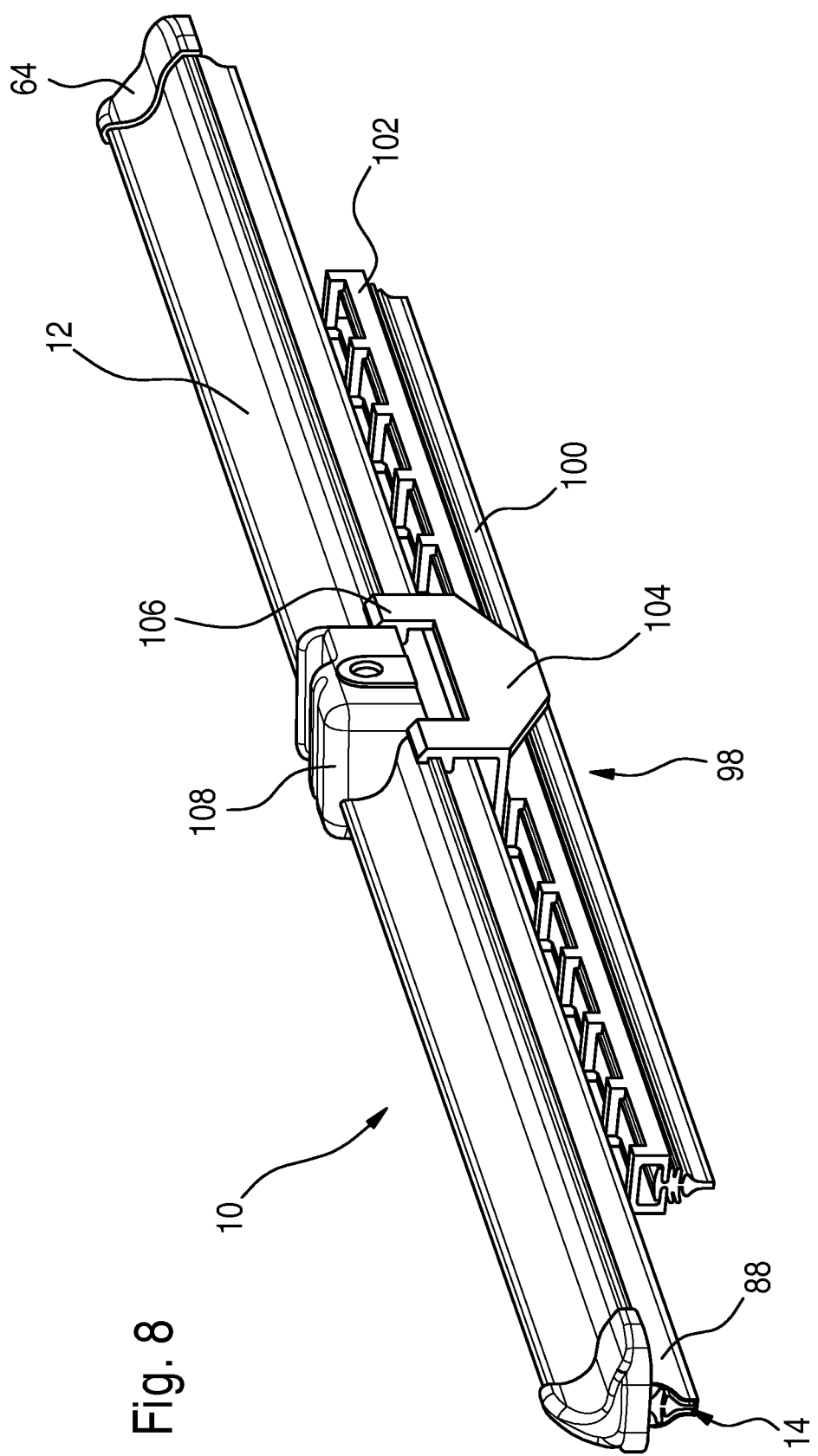

A supplemental wiper blade 98 that has a plastic holder 102 for a wiper rubber 100 is provided on the wiper blade 10 in the embodiment in FIG. 8. The plastic holder 102 is fixed to the lower side edges of the spoiler 12 via a fixing element 104 having clips 106. In this case, the clips 106 are each arranged laterally in the vicinity of a connecting element 108 for the articulated connection to a wiper arm (not shown). The supplemental wiper blade 98 can assume the wiping function better than the wiper lip 36 on the protective rails 32, 44, 56, 72 and 88 since it is not mounted until after the preservation of the vehicle and therefore is not subjected to the temperatures and chemical influences during preservation. The supplemental wiper blade 98 can be designed more simply and be shorter than a normal wiper blade 10.

The invention claimed is:

1. Wiper blade of a windshield wiper provided with a protective rail, comprising a base body which has an essentially V-shaped cross section and a wiper lip and which is detachably fixed to the wiper blade with the aid of fixing elements, characterized in that the wiper blade comprises a wiper strip with at least one flat, bar-type, elastic support element and a spoiler, wherein the base body of the protective rail has thereon, on opposite sides thereof, outwardly extending flanges, extending away from one another, respectively received in inwardly opening grooves in the spoiler.

2. Wiper blade of a windshield wiper provided with a protective rail, comprising a base body which has an essentially V-shaped cross section and a wiper lip and which is detachably fixed to the wiper blade with the aid of fixing elements, characterized in that the wiper blade comprises a wiper strip with at least one flat, bar-type, elastic support element and a spoiler, wherein the protective rail rests on the spoiler, and characterized in that the base body of the protective rail towards the spoiler has a flange that is bent outwardly by approximately 90° on each of its longitudinal sides, which flange engages in a longitudinal groove that is open to the inside, which is formed by two ribs of the spoiler, wherein the flange rests on the sides of the ribs that face one another.

3. Protective rail with holding means for use with a wiper blade of a windshield wiper, the wiper blade having a wiper strip with at least one flat, bar-type, elastic support element and a spoiler, the protective rail comprising a base body which has an essentially V-shaped cross section and a wiper lip, the protective rail being detachably fixed to the wiper blade with the aid of the holding means, wherein the holding means includes, on opposite sides of the base body of the protective rail, outwardly extending flanges, extending away from one another, respectively received in inwardly opening grooves in the spoiler.

* * * * *